(No Model.)

O. K. HAMRE.
PLOW.

No. 314,017. Patented Mar. 17, 1885.

WITNESSES:
John H. Deemer
C. Sedgwick

INVENTOR:
O. K. Hamre
BY Munn & Co
ATTORNEYS.

United States Patent Office.

OLE K. HAMRE, OF PENNINGTON, DAKOTA TERRITORY.

PLOW.

SPECIFICATION forming part of Letters Patent No. 314,017, dated March 17, 1885.

Application filed May 13, 1884. (No model.)

*To all whom it may concern:*

Be it known that I, OLE K. HAMRE, of Pennington, in the county of Minnehaha and Territory of Dakota, have invented certain new and useful Improvements in Plows, of which the following is a full, clear, and exact description.

The invention pertains to improvements in plows, having for its object to effect the adjustment of the clevis to change the draft.

The invention consists in special constructions and combination of devices for connecting the clevis and its shifting-lever, all as hereinafter fully described and claimed.

Reference is to be had to the accompanying drawings, forming a part of this specification, in which similar letters of reference indicate corresponding parts in all the figures.

Figure 1:
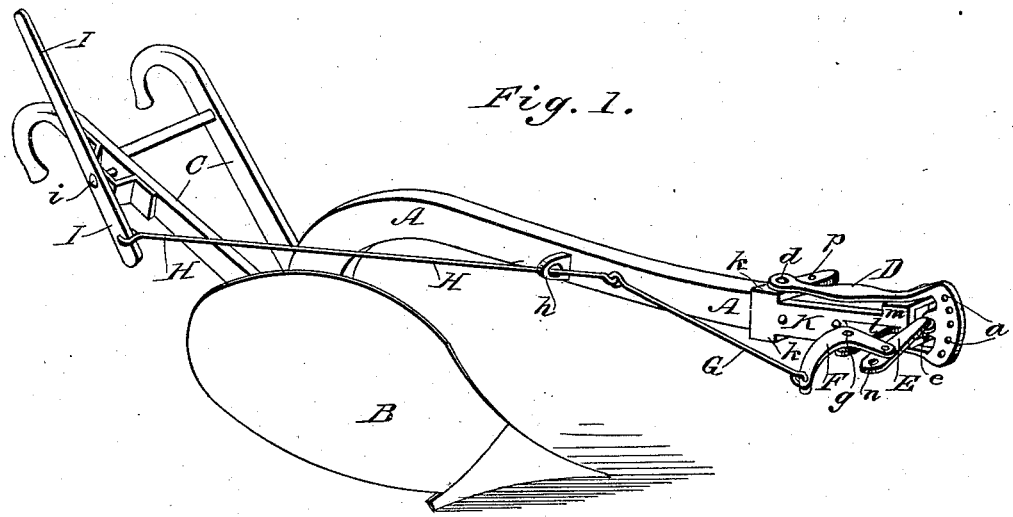
Figure 2:
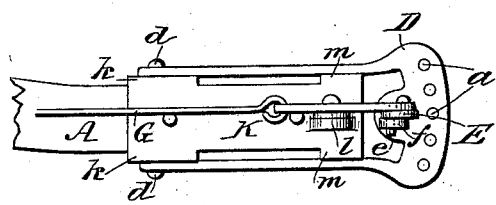
Figure 3:
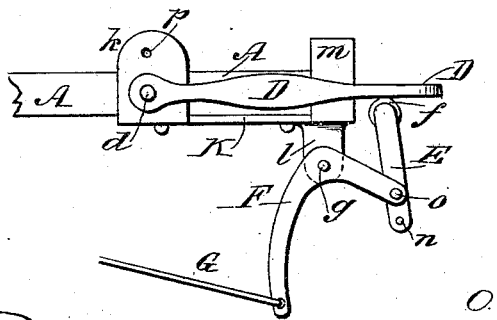

Figure 1 is a perspective view of a walking-plow with my improvement applied. Fig. 2 is a side view of the forward end of the plow-beam and clevis-connections, and Fig. 3 is a plan view thereof.

The letter A indicates the plow-beam, which may be made of metal or wood in any approved way, and may have any style of mold-board or share B, as the work to be done may require. C C are the plow-handles fixed to the beam and braced to each other in the usual way.

D represents the draft-clevis, which is pivoted to the beam A at $d$, and has the series of holes $a$, in any one of which the draft-hook may be connected to regulate the depth at which the plow is to work in the soil.

The essential feature of my invention consists in connections whereby the draft-clevis may be swung to either side of a line drawn through the longitudinal center of the plow-beam by operating a lever attached to or near the handles or rear end of the plow for shifting the clevis laterally to cause the plowshare to take or leave land or cut a wider or narrower furrow, as desired. The drawings represent a preferred arrangement of devices for accomplishing the object and with few and simple parts, as next described.

E is a rod or bar, hinged by its pivot-pin $e$ in an eye, $f$, fixed to the head of the clevis D, and so as to swing in horizontal plane. Said bar E connects, by an elbow-lever, F—pivoted to a lug on the beam—and a link, G, and rod H, with a lever, I, preferably pivoted at $i$ to one of the plow-handles C. The rod H passes through an eye, $h$, on the beam, said eye serving as a support to the parts G H and to guide their movements.

It is evident that by moving the lever I backward or forward the head of the clevis D will be shifted laterally to either side to regulate the line of draft, so as to control at will the width of the furrow cut by the plow, and this may be done without stopping the team and leaving the handles of the plow to adjust the clevis by hand. My improvement thus enables the plowman to do more and better work in a given time, as the clevis may be adjusted while the plow is at work, and the width of the furrow-slice may be more evenly and accurately regulated, and with less labor of the plowman, than is possible in adjusting the clevis in any usual way.

The clevis D and elbow-lever F may connect with the plow-beam A in various ways. I show the clevis pivoted by opposite screw-bolts at $d$ to lugs or cheek-pieces $k$ of a metal plate, K, which plate is firmly bolted to the beam, and the lever F is pivoted at $g$ to a lug, $l$, on the plate K; but any suitable means of connecting the parts D F to either a wood or metal plow-beam may be employed. At $m$ are represented side lugs or plates extending from the plate K, to afford bearings for the arms of the clevis D in any position into which the clevis may be shifted.

Extra holes $n$ may be made in the bar E for the pivot-bolt $o$, connecting the bar and the lever F, and extra holes $p$ may be provided in lugs $k$ for the pivots $d$ of the clevis, so that the parts may be adjusted as desired.

I propose to make the joints at $g$ and $i$ sufficiently close or tight to hold the clevis in any position without the use of locking devices, and I may use leather or other washers at these joints to give increased friction; but any suitable pawl and rack or other devices may be used to lock the lever I to secure the clevis, when once set, against shifting by the draft applied to it.

The lever I may be pivoted to either handle of the plow. It is shown pivoted to the right handle; but it may be preferred to pivot it to the left handle.

My improvement may be easily applied to riding-plows by arranging the lever I within reach of the plowman from his seat, as will readily be understood.

Having thus described my invention, I claim as new and desire to secure by Letters Patent—

1. The combination, with the plow-beam A, clevis D, and handles C, of the lever I, rod H, link G, elbow-lever F, and adjusting-bar E, having a pendent pivot, e, bearing in an eye, f, of the clevis D, substantially as shown and described.

2. The combination, with the plow-beam A, of the plate K, having lugs k m l, and the clevis D, bar E, and lever F, substantially as shown and described.

OLE K. HAMRE.

Witnesses:
L. B. BOTHUN,
THOMAS JOHNSON.